United States Patent
Vellanki

(10) Patent No.: US 8,937,971 B1
(45) Date of Patent: Jan. 20, 2015

(54) DUAL MODE WLAN DEVICE FOR DENSE USER ENVIRONMENTS

(75) Inventor: Mohan Vellanki, Hyderabad (IN)

(73) Assignee: Redpine Signals, Inc., San Jose, CA (US)

( * ) Notice: Subject to any disclaimer, the term of this patent is extended or adjusted under 35 U.S.C. 154(b) by 146 days.

(21) Appl. No.: 13/284,891

(22) Filed: Oct. 29, 2011

Related U.S. Application Data

(60) Provisional application No. 61/408,239, filed on Oct. 29, 2010.

(51) Int. Cl.
*H04J 3/00* (2006.01)

(52) U.S. Cl.
USPC .......................................... 370/464

(58) Field of Classification Search
CPC ......... H04W 4/24; H04W 4/26; H04W 12/08; H04W 4/001; H04W 88/06; H04W 84/12; H04W 52/0216; H04W 88/08
USPC .................. 370/310–349, 431–445, 464–526
See application file for complete search history.

(56) References Cited

U.S. PATENT DOCUMENTS

2006/0221927 A1* 10/2006 Yamada et al. ................ 370/345
2009/0310578 A1* 12/2009 Convertino et al. .......... 370/338

* cited by examiner

*Primary Examiner* — Fan Ng
(74) *Attorney, Agent, or Firm* — File-EE-Patents.com; Jay A. Chesavage

(57) ABSTRACT

A dual mode wireless device operations in a client mode and observes network congestion conditions. When the network congestion exceeds a threshold level, the dual mode wireless device changes to an access point mode and advertises itself to other clients, thereby reducing the network congestion level.

18 Claims, 2 Drawing Sheets

Distributed Access Points in Stadium

Distributed Access Points in Stadium

Access Point and Stations in Stadium

Access Point, dual-mode device, and Stations
(STA mode)

Access Point, dual-mode device, and Stations
(AP mode)

DUAL MODE WLAN DEVICE FOR DENSE USER ENVIRONMENTS

The present application claims priority of provisional patent application 61/408,239 filed Oct. 29, 2010.

FIELD OF THE INVENTION

The present invention relates to a wireless device for use in WLAN environments. In particular, the invention relates to a dual mode device which switches between an AP mode and a client mode in IEEE 802.11 wireless networks.

BACKGROUND OF THE INVENTION

FIG. 1 shows a stadium with users of wireless devices associated with access points AP1 102, AP2 104, and AP3 106. Each access point such as 104 is associated with a plurality of users 120-1, 120-2, ..., 120-N. The plurality of users with a particular access point AP2 104 is shown in FIG. 2.

OBJECTS OF THE INVENTION

A first object of the invention is a dual mode wireless device which switches from station mode to access point mode when certain network conditions are detected, such as congestion, number of stations associated with a particular access point, or reduction in data rate.

A second object of the invention is a dual mode wireless device which is capable of operation in either wireless access point infrastructure mode or wireless station mode.

SUMMARY OF THE INVENTION

The invention is a dual mode wireless device (known as LiteAP) for use in networks such as those described by the IEEE 802.11 series of wireless standards. The LiteAP device initializes in station mode, and may associate with an access point and send and receive wireless traffic through the access point. After operation in station mode, the dual mode LiteAP device may switch to access point mode upon detection of any of several threshold conditions, such as detection of a data rate reduction below a particular threshold, detection of a threshold number of active wireless stations, geographical or station location relative to other stations and access points, or any other throughput-related metric.

DETAILED DESCRIPTION OF THE INVENTION

The present invention is directed to a multi-function wireless network device which can switch between client mode and access point (AP) mode in an 802.11 WLAN network using network congestion measurements, and without any user interaction.

802.11 WLAN is today the de-facto standard in wireless networking. However, in areas with large concentration of Wi-Fi users, the quality of connectivity tends to fall drastically. In crowded environments such as sports stadiums, there is often a gathering of several tens of thousand spectators, a sizeable fraction of who attempt to use the Wi-Fi access provided locally.

The present invention provides a special function device that can operate in station (client) and access point mode, and intelligently switch between these two modes. In a station mode the device connects to the infrastructure such as an access point for connectivity. This functionality is similar to other such standard clients.

In an access point mode the device acts as a repeater station for an infrastructure access point, and provides connectivity to other clients in the near geographical location of the dual mode device. The dual mode device will dynamically switch the mode of operation depending on number of users, traffic and QOS requirements. Dynamic switching will allow in designing the network topology by controlling the number of active AP's in a crowded environment. Using the present dual mode device dispersed in a dense network, the number of active AP's can be increased or decreased without impacting the number of installed infrastructure AP's.

Figure 1:
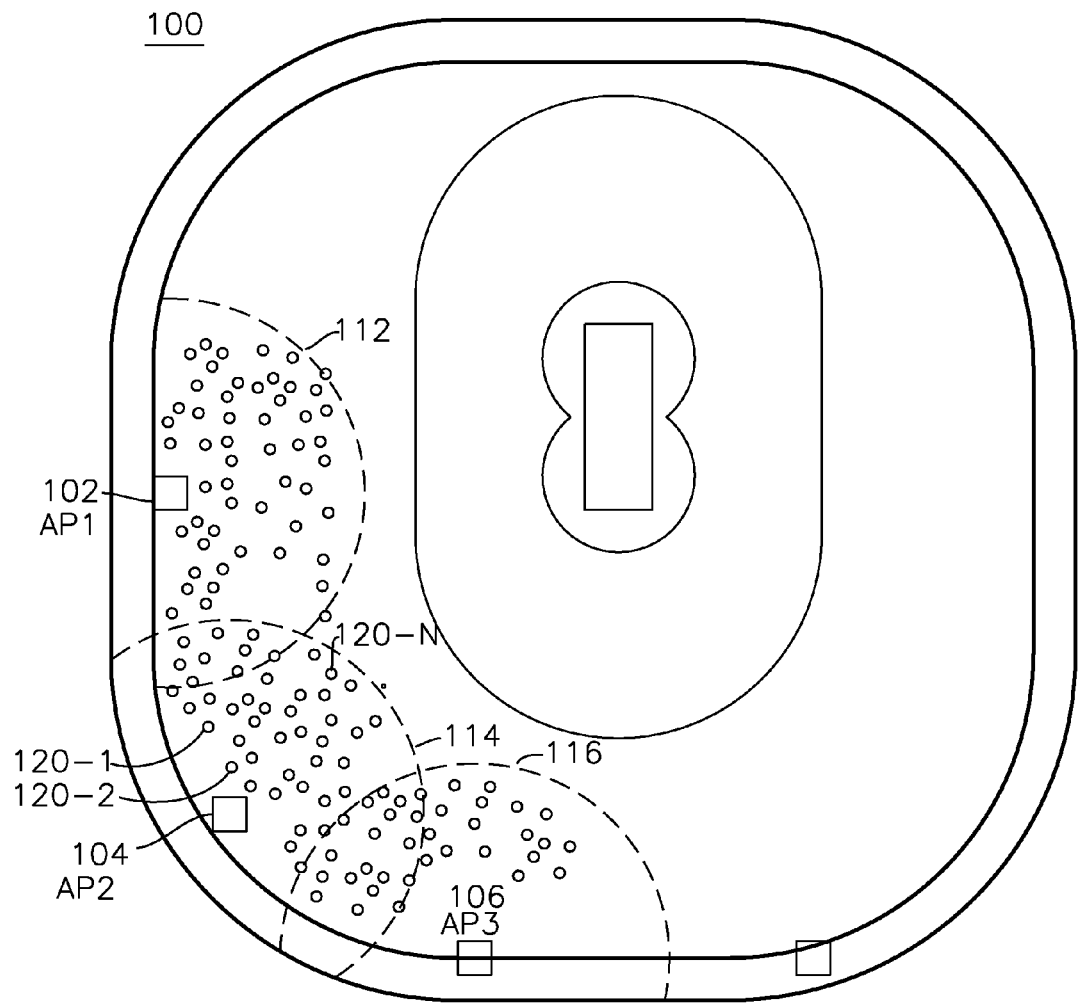
FIG. 1 shows the plan view of a stadium with wireless stations and access points.
Figure 2:
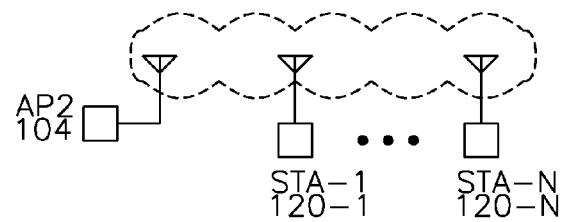
FIG. 2 shows a plurality of stations associated with an access point.
Figure 3A:
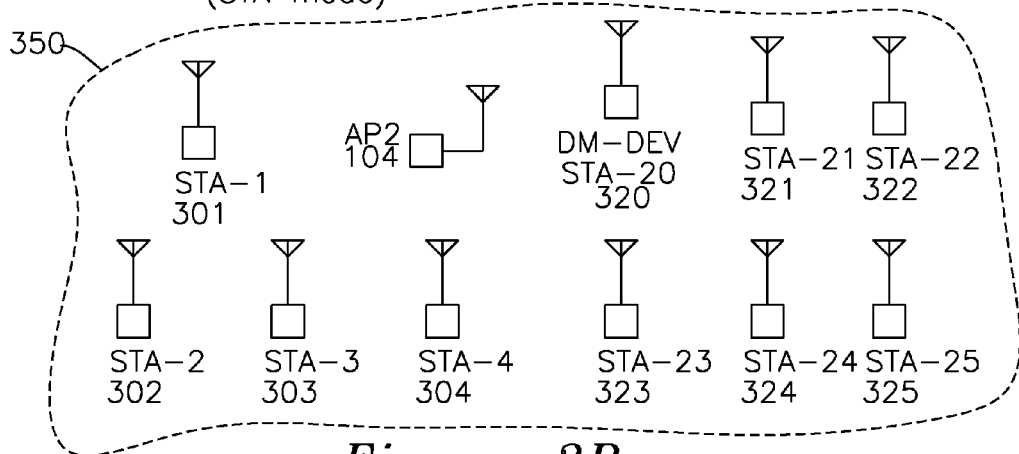
FIG. 3A shows an access point with a dual mode device in station mode, and other stations.

FIG. 3A shows a typical cell 350 populated by number of clients 301, 302, 303, 304, 321, 322, 323, 324, and 325, an infrastructure access point 104, and a dual mode device in station mode STA-20 320-STA. While one dual mode device 320-STA is shown, any number of them may be present, and the cell 350 can have a combination of the dual mode device and standard clients along with multiple infrastructure access points.

Figure 3B:
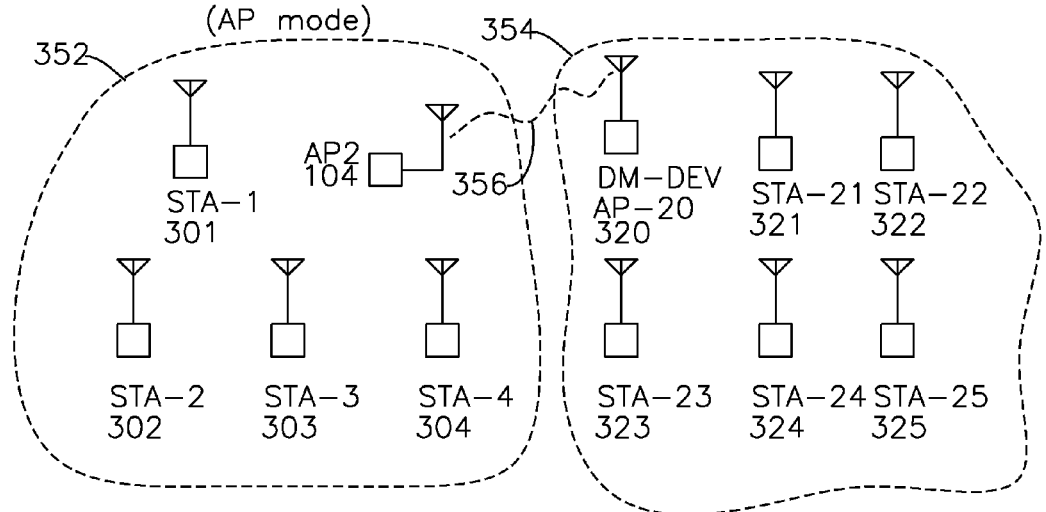
FIG. 3B shows an access point with a dual mode device in access point mode, and other stations.

Upon detection of network congestion by the dual mode device 320 in cell 350 of FIG. 3A, the dual mode device 320-STA remains associated to AP2 104 as a station via link 354 and advertises itself as an access point AP-20 320-AP to stations 321, 322, 323, 234 and 325 as shown in FIG. 3B. The AP functionality of dual mode device 320-AP in access point mode will be a subset of standard access point and is known as LiteAP™. LiteAP 320-AP can have the characteristics of a repeater, receiving packets from infrastructure AP2 104 over link 356 with the LiteAP 320-AP operating as a station to infrastructure AP 104, thereby extending the reach of AP2 104 by advertising beacons and connecting to local stations as their access point, and providing access point capabilities for the localized cell for stations 321, 322, 323, 235, and 325. This enables the dual mode device 320-AP to force the remaining stations 321, 322, 323, 234, or 325 in the cell to connect to LiteAP instead of the previous infrastructure AP 350 of FIG. 3A. The LiteAP 320-AP can also provide for buffering capabilities. This will help in reducing throughput requirements on a standard AP emerging from simultaneous connections to the same infrastructure AP. A LiteAP 320-AP allows the introduction of other proprietary modes of transmission into a standard 802.11 environment without disrupting the existing infrastructure and network operation.

A metric measurement and threshold step provides metrics to switch one of the special devices into LiteAP mode. The switch to LiteAP mode allows for the creation of a smaller cell within the standard infrastructure cell. Several criteria may be used to form the metric, among which are:

1. The number of users in either a specific geographic or logical location.

2. The number of client connections on a standard infrastructure access point, as detected by the dual mode device examining traffic to that AP.

3. The amount of traffic between different clients and a standard infrastructure access point.

The operation of the device in client and AP mode is transparent to a user and is controlled based on intelligence in the infrastructure. The switching is controlled based on a variety of algorithms executing in the infrastructure through multiple such devices.

In one example of the invention, upon detection of a threshold condition, the dual mode station STA-20 converts from a client to an access point in repeater mode.

In another example of the invention, the dual mode device operates as an access point to local stations and as a station to the infrastructure AP, buffering packets from the infrastructure AP and then transmitting those packets to stations which associate with the dual mode device.

I claim:

1. A method for a dual-mode wireless device operative in an infrastructure network having at least one access point transmitting beacon packets to a plurality of stations, the method including:
 a step of the dual-mode wireless device initializing in a station mode, thereafter receiving wireless beacon packets from said at least one access point, said dual-mode wireless device thereafter associating with a particular access point in a station mode;
 a metric measurement step where certain network operational measurements are made, the measurements providing an indication of network congestion or network availability;
 a threshold step where, upon detection of said metric measurement step exceeding a threshold, said dual-mode wireless device operates in an access point mode and transmits access point beacons;
 an access point mode step following said threshold step where said dual-mode wireless device operates concurrently as a station to said particular access point and also as an access point to locally associated stations which have responded to a previously sent access point beacon with an association request and associate with the dual mode wireless device, the dual mode wireless device thereafter forwarding wireless packets between said locally associated stations and said particular access point.

2. The method of claim 1 where said threshold step includes a data rate measurement made during said metric measurement step.

3. The method of claim 1 where said threshold step includes the examination of content received from an access point during said metric measurement step.

4. The method of claim 1 where said metric measurement step includes the identification of the number of active stations associated with an access point.

5. The method of claim 1 where said access point mode and said station mode are provided during exclusive time intervals.

6. A method for a dual-mode wireless device, the method including:
 a station mode step of the dual-mode wireless device initializing in a station mode;
 a metric measurement step where certain network operational measurements are made, the measurements providing an indication of network congestion or network availability;
 a threshold step where, upon detection of said metric measurement step exceeding a threshold, said dual-mode wireless device operates in an access point mode and transmits access point beacons;
 an access point mode step following said threshold step where said dual-mode wireless device operates in an access point mode and associates with stations which seek to join the dual mode wireless device, the access point step also measuring network congestion metrics;
 a reversion step whereby said access point network congestion metrics are used to return to said station mode step when network congestion falls below a particular threshold.

7. The method of claim 6 where said access point mode step includes transferring data between said access point and said stations.

8. The method of claim 6 where said metric measurement step is at least one of: the number of users in a geographic location or logical location, the number of client connections, data utilization of said station mode, or the amount of data transferred from said access point to said stations.

9. The method of claim 6 where said threshold step switching into access point mode is based on at least one of: the number of active stations in said station mode, data utilization of said station mode, or the amount of data transferred from said access point to said stations.

10. The method of claim 6 where said reversion step is based on at least one of: the number of active stations in said station mode, data utilization of said station mode, or the rate or amount of data transferred between said access point and said stations.

11. A dual-mode wireless device operative for transmitting and receiving wireless packets in both an access point (AP) mode and a station (STA) mode in response to a controller;
 said controller placing said wireless device in said STA mode, and thereafter associating with a remote access point;
 said controller examining traffic in said STA mode and forming metrics;
 said controller enabling said AP mode of operation when said metric exceeds a first threshold, said AP mode resulting in said AP mode transmitting beacons;
 said controller accepting association requests from stations to said AP mode beacons until a threshold is reached, said threshold being a number of associated station on said remote access point;
 said controller repeating packets between said remote access point and said AP mode access point.

12. The method of claim 11 where said AP mode is compliant with at least one of the IEEE 802.11 wireless network standards.

13. The method of claim 11 where said first threshold is at least one of: data throughput of said remote access point, the number of active wireless stations, a geographical location, or a station location relative to other stations or access points.

14. The method of claim 11 where said beacons include association identifiers.

15. The method of claim 11 where said controller disables said AP mode when said metrics fall below a second threshold.

16. The method of claim 15 where said second threshold is at least one of: a number of active stations associated with said access point mode, a data rate through said access point mode, or a geographical location.

17. A dual-mode wireless device operative for transmitting and receiving wireless packets in both an access point (AP) mode and a station (STA) mode in response to a controller;
 said controller placing said wireless device in said STA mode, and thereafter associating with a remote access point;

said controller examining traffic in said STA mode and forming metrics;

said controller enabling said AP mode of operation when said metric exceeds a first threshold, said AP mode resulting in said AP mode transmitting beacons;

said controller accepting association requests from stations to said AP mode beacons until a threshold is reached;

said controller repeating packets between said remote access point and said AP mode access point;

and where said controller stops sending beacons when said metrics fall below a second threshold.

18. The method of claim 17 where said second threshold is at least one of: a number of active stations associated with said access point mode, a data rate through said access point mode, or a geographical location.